Nov. 12, 1940.                W. BRUCKMANN                2,221,573
                              IMPULSE GENERATOR
                            Filed Aug. 18, 1939

WITNESSES:
G. J. Fitzgerald
F. P. Lyle

INVENTOR
Werner Bruckmann.
BY
O. B. Buchanan,
ATTORNEY

Patented Nov. 12, 1940

2,221,573

UNITED STATES PATENT OFFICE 2,221,573

IMPULSE GENERATOR

Werner Bruckmann, Kassel-Kirchditmold, Germany, assignor to Westinghouse Electric & Manufacturing Company, East Pittsburgh, Pa., a corporation of Pennsylvania Application August 18, 1939, Serial No. 290,844
In Germany September 1, 1938

10 Claims. (Cl. 171—97)

The present invention relates to impulse generators, and more particularly to an impulse generator which can be operated on a relatively low voltage and which can readily be made portable.

Impulse generators usually consist of a plurality of capacitors which are connected in parallel to be charged from a suitable source of direct current, and which are then discharged in series so that their voltages add and a high impulse voltage is obtained. In the usual arrangement, the capacitors are permanently connected in parallel and the series connection is made by means of spark gaps which are connected between adjacent capacitors. When the voltage across the gaps becomes sufficiently high, they break down and complete the series circuit to permit the capacitors to discharge. Open spark gaps, such as are usually used, require a high voltage to break them down even if they are closely set, and a relatively high voltage must therefore be used for charging the capacitors. For this reason, it is possible to use an impulse generator of this type only at a fixed location where the necessary high voltage is available, and these generators have necessarily been very large in size and cumbersome in order to provide the requisite insulation and clearances for the high voltages used.

The object of the present invention is to provide an impulse generator in which the discharge which connects the capacitors in series is initiated at a relatively low voltage so that it is not necessary to provide a high voltage source for charging the capacitors.

Another object of the invention is to provide an impulse generator which can be made relatively small in size and compact, and which can readily be made portable.

In carrying out these objects, electric discharge devices of a type in which the discharge is initiated at a relatively low voltage are used to complete the series connection for discharging the capacitors. Glow lamps have been found very suitable for this purpose but other types of discharge devices such as gas-filled discharge tubes may also be utilized. In this way, the discharge takes place when the voltage across the discharge devices is relatively low, and it is not necessary to provide a high voltage source for charging the capacitors. By using a sufficient number of capacitors, impulse voltages of any desired magnitude can be obtained from the generator.

Since the charging voltage is relatively low, the problem of insulation is greatly simplified and the generator can be made quite small and compact. Furthermore, as a result of the low charging voltage, the use of the generator is not restricted to a fixed location, but it may be used in any place where direct current of the ordinary commercial voltages is available. For these reasons, the generator can easily be made portable and moved to wherever it may be needed where a low voltage direct current supply is available. Another advantage of the low charging voltage is that it is possible to use batteries for charging the capacitors, and the generator can then be made completely self-contained as well as portable. Thus, many advantages are obtained by the use of low voltage discharge devices to connect the capacitors of an impulse generator in series.

The invention will be more fully understood from the following detailed description, taken in connection with the accompanying drawing, in which.

Figure 1:
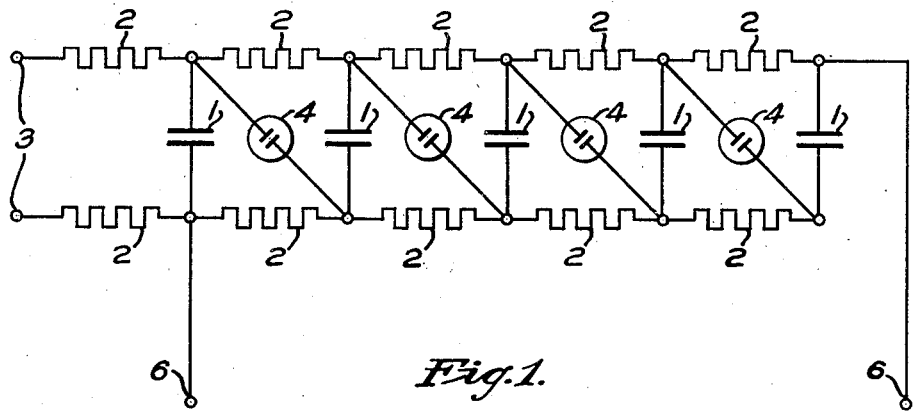
Figure 1 is a wiring diagram showing one embodiment of the invention.

The impulse generator shown in Figure 1 consists of a plurality of capacitors 1 which are permanently connected in parallle through resistors 2 to a pair of input terminals 3. The capacitors 1 are arranged to be discharged by connecting them in series by means of discharge devices 4 which are connected between terminals of opposite polarity of adjacent capacitors. It will be apparent from the drawing that when the discharge devices 4 become conducting, the capacitors 1 are all connected in series to the output terminals 6, so that the impulse voltage which appears across these terminals is equal to the sum of the voltages of the individual capacitors.

The discharge devices 4 may be of any suitable type in which the discharge takes place at a relatively low voltage. Glow lamps have been found suitable for this purpose, but any other suitable type of device may be used in which a glow discharge, or other type of discharge is initiated at a relatively low voltage across the device. Thus, any suitable type of enclosed discharge device, either gas-filled or evacuated, may be used. It is also within the scope of the invention to use other special types of discharge devices for special purposes. Thus, in some cases it might be desirable to use light-sensitive cells in which the discharge is controlled by the presence or absence of light falling on the cell. Other special types of low voltage discharge devices in which the discharge is initiated in response to external conditions may be utilized when necessary for special purposes.

The operation of the generator should now be apparent.

Any suitable direct current source may be connected to the terminals 3 to charge the capacitors, and the voltage of the source may be relatively low because of the type of discharge devices used for connecting the capacitors in series. Thus, voltages as low as 100 volts will give satisfactory operation, and it is therefore possible to supply the generator from ordinary distribution networks, rectifier tubes, batteries or other readily available souces. The capaciors 1 are charged in parallel through the resistors 2, and when the voltage across the discharge devices 4 has risen to the proper value, they will commence discharging and become conducting, so that the capacitors 1 will be connected in series between the terminals 6 and an impulse voltage will appear across these terminals which is equal to the sum of the individual voltages of the capacitors. It is evident that an impulse voltage of any desired magnitude can be obtained by using a sufficient number of capacitors.

Figure 2:
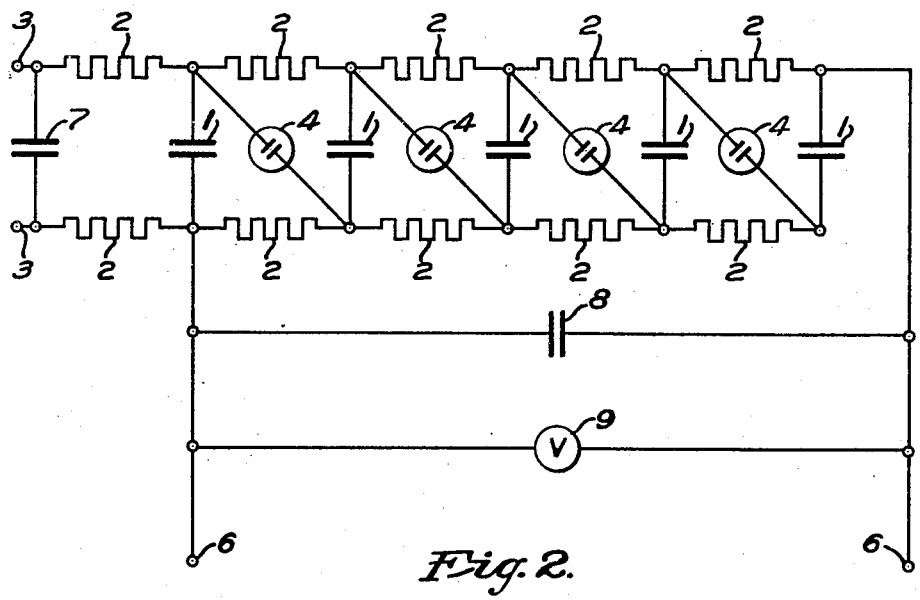
Fig. 2 is a similar diagram showing a further embodiment of the invention.

In some cases it may be desirable to utilize the embodiment of the invention shown in Fig. 2. The arrangement of the capacitors 1 and discharge devices 4 in this figure is identical with that described above and the generator functions in the same manner. In this embodiment of the invention, however, a capacitor 7 is connected across the terminals 3. The use of this capacitor is particularly desirable when a pulsating direct current, such as may be obtained from a rectifier tube, is used for charging the capacitors, since it smooths the voltage wave and thus improves the operation. The capacitor 7 preferably has a capacitance which is equal to the resultant capacitance of all the capacitors 1 in parallel. Thus, if the capacitors 1 all have the same capacitance C, the capacitance of the capacitor 7 should be $Cn$, where $n$ is the number of capacitors 1. The capacitors 1 are then, in effect, charged from the capacitor 7 so that the rate of charging is accelerated and is made independent of the resistance of the current source from which the generator is supplied.

It may also be found desirable in some cases to connect a capacitor 8 across the terminals 6. This capacitor preferably has a capacitance equal to the resultant capacitance of all the capacitors 1 in series, which is equal to $$\frac{C}{n}$$

if the capacitors 1 are all identical. The capacitor 8 is thus capable of absorbing the entire charge from the generator, and in some cases this will improve the operation.

It will now be obvious that because only a low voltage is required for operation of the generator, it may be made quite small and compact, and since the necessary low voltage is readily available in many locations, the generator can be made portable, thus greatly increasing its usefulness for such purposes as testing over that of the older types of impulse generators which are necessarily built in a fixed location. The generator of the present invention can be mounted on a base and readily moved from place to place wherever it may be needed, and if desired, a suitable portable direct current source can also be provided to accompany the generator. As a further possibility, the direct current source may take the form of a battery which can be built into the generator itself to provide a completely self-contained portable unit. It is desirable in such a unit to provide an electrostatic voltmeter 9 permanently connected across the terminals 6, and such a meter may be calibrated to read directly in terms of a quantity to be measured when the generator is to be used for a purpose such as determining ground resistances.

It will be seen therefore that an impulse generator has been provided which requires only a low voltage for operation and which can readily be made portable. This advantageous result is obtained by the use of low voltage discharge devices, such as glow lamps, to connect the capacitors of the generator in series. It is to be understood that any suitable type of discharge device may be used, and that various special types of discharge devices, such as light-sensitive cells, may be used to adapt the generator to special purposes.

It is to be understood, therefore, that although a specific embodiment of the invention has been illustrated and described, it is not limited to the exact arrangement shown, but that, in its broadest aspect, it includes all equivalent embodiments and modifications which come within the scope of the appended claims.

I claim as my invention:

1. An impulse generator comprising a plurality of capacitors normally connected in parallel to be charged from a direct current source, and means for connecting said capacitors in series to discharge them, said means consisting of a plurality of electric discharge devices connected between terminals of opposite polarity of adjacent capacitors, said devices being of a type in which the discharge takes place in an enclosed space at a relatively low voltage.

2. An impulse generator comprising a plurality of capacitors normally connected in parallel to be charged from a direct current source, and means for connecting said capacitors in series to discharge them, said means consisting of a plurality of electric discharge devices connected between terminals of opposite polarity of adjacent capacitors, and devices being of a type in which the discharge takes place in an enclosed, evacuated space at a relatively low voltage.

3. An impulse generator comprising a plurality of capacitors normally connected in parallel to be charged from a direct current source, and means for connecting said capacitors in series to discharge them, said means consisting of a plurality of electric discharge devices connected between terminals of opposite polarity of adjacent capacitors, said devices being of a type in which a glow discharge takes place at a relatively low voltage.

4. An impulse generator comprising a plurality of capacitors normally connected in parallel to be charged from a direct current source, and means for connecting said capacitors in series to discharge them, said means consisting of a plurality of glow discharge devices connected between terminals of opposite polarity of adjacent capacitors.

5. An impulse generator comprising a plurality of capacitors normally connected in parallel to be charged from a direct current source, and means for connecting said capacitors in series to discharge them, said means consisting of a plurality of electric discharge devices connected between terminals of opposite polarity of adjacent capacitors, said devices being of a type in which the discharge is initiated in response to an external condition.

6. An impulse generator comprising a plurality of capacitors normally connected in parallel to be charged from a direct current source, and means for connecting said capacitors in series to discharge them, said means consisting of a plurality of light-sensitive electric discharge devices connected between terminals of opposite polarity of adjacent capacitors.

7. An impulse generator comprising a plurality of capacitors normally connected in parallel to a pair of input terminals for charging, means to connect said capacitors in series to a pair of output terminals to discharge them, said means consisting of a plurality of enclosed electric discharge devices connected between terminals of opposite polarity of adjacent capacitors, said devices being of a type in which the discharge is initiated at a relatively low voltage, and a capacitor of greater capacitance than said first mentioned capacitors connected across the input terminals.

8. An impulse generator comprising a plurality of capacitors normally connected in parallel to a pair of input terminals for charging, means to connect said capacitors in series to a pair of output terminals to discharge them, said means consisting of a plurality of enclosed electric discharge devices connected between terminals of opposite polarity of adjacent capacitors, said devices being of a type in which the discharge is initiated at a relatively low voltage, and a capacitor of greater capacitance than said first mentioned capacitors connected across the input terminals, the capacitance of said last mentioned capacitor being equal to the resultant capacitance of all of said first mentioned capacitors in parallel.

9. An impulse generator comprising a plurality of capacitors normally connected in parallel to a pair of input terminals for charging, means to connect said capacitors in series to a pair of output terminals to discharge them, said means consisting of a plurality of glow discharge devices connected between terminals of opposite polarity of adjacent capacitors, said devices being of a type in which the discharge is initiated at a relatively low voltage, a capacitor of greater capacitance than said first mentioned capacitors connected across the input terminals, and a capacitor connected across the output terminals.

10. An impulse generator comprising a plurality of capacitors normally connected in parallel to a pair of input terminals for charging, means to connect said capacitors in series to a pair of output terminals to discharge them, said means consisting of a plurality of glow discharge devices connected between terminals of opposite polarity of adjacent capacitors, said devices being of a type in which the discharge is initiated at a relatively low voltage, a capacitor having a capacitance equal to the resultant capacitance of said first mentioned capacitors in parallel connected across the input terminals, and a capacitor having a capacitance equal to the resultant capacitance of said first mentioned capacitors in series connected across the output terminals.

WERNER BRUCKMANN.